United States Patent
Guo et al.

(10) Patent No.: US 11,052,307 B2
(45) Date of Patent: Jul. 6, 2021

(54) METHOD AND APPARATUS FOR CONTROLLING VIRTUAL OBJECT TO MOVE, ELECTRONIC DEVICE, AND STORAGE MEDIUM

(71) Applicant: Tencent Technology (Shenzhen) Company Limited, Shenzhen (CN)

(72) Inventors: Zhaoxing Guo, Shenzhen (CN); Zhitang Lu, Shenzhen (CN); Xuyang Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/883,855

(22) Filed: May 26, 2020

(65) Prior Publication Data

US 2020/0282308 A1   Sep. 10, 2020

Related U.S. Application Data

(63) Continuation of application No. PCT/CN2019/078804, filed on Mar. 20, 2019.

(30) Foreign Application Priority Data

Mar. 30, 2018   (CN) .......................... 201810277232.X

(51) Int. Cl.
*A63F 13/2145* (2014.01)
*A63F 13/537* (2014.01)
*A63F 13/822* (2014.01)

(52) U.S. Cl.
CPC ........ *A63F 13/2145* (2014.09); *A63F 13/537* (2014.09); *A63F 13/822* (2014.09)

(58) Field of Classification Search
CPC ... A63F 13/822; A63F 13/2145; A63F 13/537
See application file for complete search history.

(56) References Cited

U.S. PATENT DOCUMENTS

| 9,348,488 B1* | 5/2016 | Renema, II ........... G06F 3/0482 |
| 10,180,714 B1* | 1/2019 | Kin ....................... G06F 3/0482 |

(Continued)

FOREIGN PATENT DOCUMENTS

| CN | 105630374 A | 6/2016 |
| CN | 106237615 A | 12/2016 |

(Continued)

OTHER PUBLICATIONS

Tencent Technology, ISR, PCT/CN2019/078804, Jun. 5, 2019, 2 pgs.

(Continued)

*Primary Examiner* — Steve Rowland
(74) *Attorney, Agent, or Firm* — Morgan, Lewis & Bockius LLP

(57) ABSTRACT

Embodiments of the present disclosure provide a method for controlling the movement of a virtual object performed by an electronic device. A first button is displayed at a first position of a screen. A second button is displayed at a second position of the screen when a first touch operation is detected. When a second touch operation on the second button is detected, a virtual object is controlled to move automatically, and the two buttons are highlighted. The automatic movement of the virtual object and the linkage between the two buttons are implemented through simple operations, thereby improving the convenience and flexibility of operations.

20 Claims, 12 Drawing Sheets

(56) References Cited

U.S. PATENT DOCUMENTS

| | | | |
|---|---|---|---|
| 10,603,589 B2* | 3/2020 | Miyamoto | A63F 13/2145 |
| 2009/0143141 A1* | 6/2009 | Wells | G07F 17/3237 |
| | | | 463/37 |
| 2010/0045667 A1* | 2/2010 | Kornmann | G06F 3/017 |
| | | | 345/419 |
| 2014/0243092 A1 | 8/2014 | Morita et al. | |
| 2017/0182407 A1* | 6/2017 | Steele | A63F 9/24 |
| 2018/0008888 A1 | 1/2018 | Kim | |
| 2018/0164801 A1* | 6/2018 | Kim | H04M 1/72415 |

FOREIGN PATENT DOCUMENTS

| | | |
|---|---|---|
| CN | 107019909 A | 8/2017 |
| CN | 107132988 A | 9/2017 |
| CN | 107754309 A | 3/2018 |
| CN | 108379844 A | 8/2018 |

OTHER PUBLICATIONS

Tencent Technology, WO, PCT/CN2019/078804, Jun. 5, 2019, 4 pgs.
Tencent Technology, IPRP, PCT/CN2019/078804, Oct. 6, 2020, 5 pgs.

* cited by examiner

METHOD AND APPARATUS FOR CONTROLLING VIRTUAL OBJECT TO MOVE, ELECTRONIC DEVICE, AND STORAGE MEDIUM

CROSS-REFERENCE TO RELATED APPLICATIONS

This application is a continuation application of PCT Application No. PCT/CN2019/078804, entitled "METHOD AND APPARATUS FOR CONTROLLING VIRTUAL OBJECT TO MOVE, AND ELECTRONIC DEVICE AND STORAGE MEDIUM" filed on Mar. 20, 2019, which claims priority to Chinese Patent Application No. 201810277232.X, entitled "METHOD AND APPARATUS FOR CONTROLLING VIRTUAL OBJECT TO MOVE, ELECTRONIC DEVICE, AND STORAGE MEDIUM" filed with the Chinese National Intellectual Property Administration on Mar. 30, 2018, all of which are incorporated by reference in their entirety.

FIELD OF THE TECHNOLOGY

The present disclosure relates to the field of computer technologies, and in particular, to a method and apparatus for controlling a virtual object to move, an electronic device, and a storage medium.

BACKGROUND OF THE DISCLOSURE

With the development of computer technologies and the diversification of functions of a terminal, increasing types of games can be played on the terminal. Shooting games such as first-person shooting (FPS) games or third-person shooting (TPS) games are relatively popular games. In the shooting games, there is a new type of game called tactical competitive game. In this new type of game, there are many players in the same virtual scene in a single round of the game, and a player may control a virtual object to phase out opponents through attacks such as shooting or boxing to win a final victory.

At present, a virtual scene of such a game is relatively large. Due to a need for strategic transfer, a player often needs to control a virtual object to move over a long distance. As a result, the player needs to continue the same touch operation for a long time to control the virtual object to move.

SUMMARY

Embodiments of the present disclosure provide a method and apparatus for controlling a virtual object to move, an electronic device, and a storage medium, to improve the convenience and flexibility of operations. The technical solutions are as follows:

According to an aspect, a method for controlling the movement of a virtual object is provided at an electronic device having one or more processors and memory storing programs to be executed by the one or more processors, the method including:

displaying a first button at a first position on a screen, a display status of the first button being used for reflecting whether the virtual object moves automatically at a target speed;

displaying, in a case that a first touch operation on a virtual joystick area is detected, a second button at a second position based on the first touch operation, the first position and the second position being respectively located in different areas on the screen; and controlling the virtual object to move automatically at the target speed in a virtual scene and setting display statuses of the first button and the second button to be highlighted, in a case that a second touch operation on the second button is detected.

According to an aspect, an electronic device is provided, including a processor and a memory configured to store a computer program, the processor being configured to execute the computer program stored in the memory to implement the method for controlling the movement of a virtual object.

According to an aspect, a non-transitory computer-readable storage medium is provided, storing a computer program, when being executed by a processor, the computer program implementing the method for controlling the movement of a virtual object to move.

In the embodiments of the present disclosure, the second button is displayed when it is detected that the touch operation on the virtual joystick area meets a requirement, and when the touch operation on the second button is detected, the virtual object can be controlled to move automatically and the display statuses of the two buttons corresponding to the automatic movement function are set to be highlighted, so that the automatic movement of the virtual object and the linkage between the two buttons can be implemented through simple touch operations, and a user does not need to manually synchronize the display statuses of the two buttons, thereby reducing the complexity of user operations and improving the convenience and flexibility of user operations.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
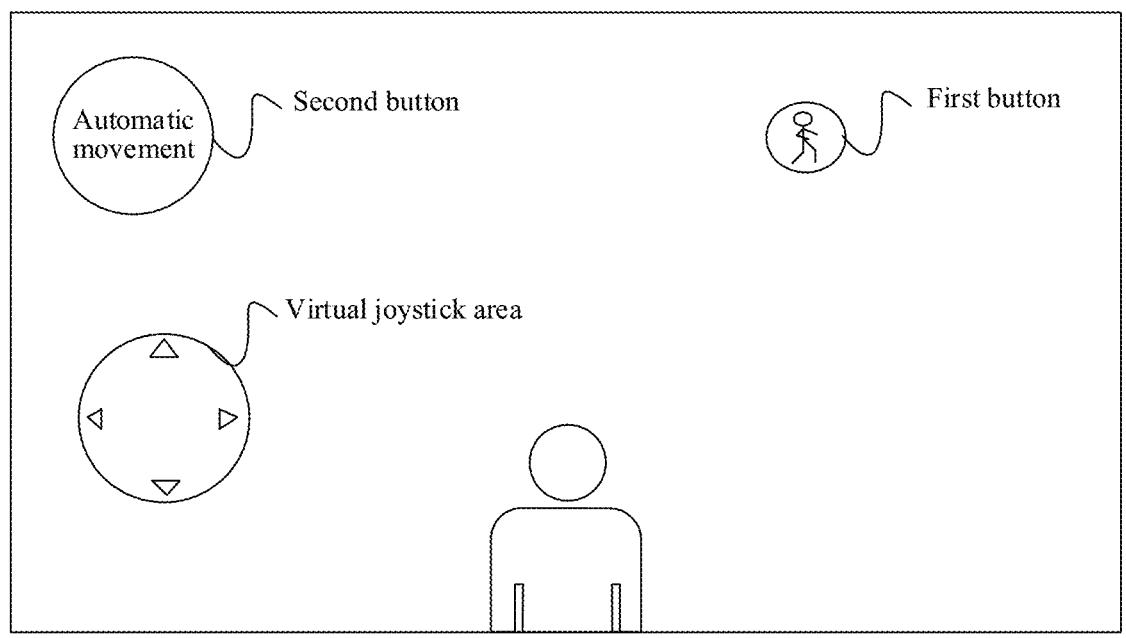
FIG. 1 is a schematic diagram of a terminal interface according to an embodiment of the present disclosure.

To make the objectives, technical solutions, and advantages of the present disclosure clearer, the following further describes implementations of the present disclosure in detail with reference to the accompanying drawings.

The embodiments of the present disclosure mainly relate to video game or simulated training scenarios. For example, in a scenario of a video game, a user may perform an operation on a terminal in advance, and the terminal may download a game configuration file of the video game after detecting the user's operation. The game configuration file may include an application program, interface display data, virtual scene data, or the like of the video game. Accordingly, the game configuration file may be called when the user logs in to the video game on the terminal, to render and display a video game interface. The user may perform a touch operation on the terminal. The terminal may obtain game data corresponding to the touch operation after detecting the touch operation, and render and display the video game interface by using the game data. The game data may include virtual scene data, behavior data of a virtual object in a virtual scene, and the like.

In the embodiments of the present disclosure, the virtual scene may be used for simulating a three-dimensional virtual space or a two-dimensional virtual space, which may be an open space. The virtual scene may be used for simulating a real environment. For example, the virtual scene may include sky, land, ocean, and the like, and the land may include environmental elements such as deserts and cities. The user may control a virtual object to move in the virtual scene. The virtual object may be an avatar for representing the user in the virtual scene. The avatar may be in human, animal, or any other form, which is not limited in the present disclosure. For example, in a shooting game, the user may control the virtual object to freely fall, glide, or open a parachute to fall in the sky, run, jump, crawl, or bend forward on the land, or swim, float, or dive in the ocean in the virtual scene. Certainly, the user may alternatively control the virtual object to move by a vehicle in the virtual scene. The foregoing scenes are merely used as examples for description, and the embodiments of the present disclosure are not specifically limited thereto. The user may alternatively control the virtual object to fight against other virtual objects through a weapon. The weapon may be a cold weapon or a hot weapon, which is not specifically limited in the embodiments of the present disclosure.

When the user wants to control the virtual object to move, the user may perform a touch operation on a virtual joystick area on a terminal screen. The user's touch operation on the virtual joystick area may be a slide operation or a click/tap operation, which is not limited in the embodiments of the present disclosure. A shape of the virtual joystick area may be circular or square, which is not specifically limited in the embodiments of the present disclosure. The terminal may obtain, according to a relative position between an end point of the user's touch operation and the virtual joystick area, a direction and a speed wanted by the user to control the virtual object to move. A displacement may be a distance between an end point position of the touch operation and a center point of the virtual joystick area. The center point may be located at the center of the virtual joystick area, or at another position, which is not specifically limited in the embodiments of the present disclosure. In a possible implementation, the terminal may obtain a movement speed of the controlled virtual object corresponding to the touch operation according to the displacement of the touch operation. Specifically, the movement speed of the virtual object may be proportional to the displacement. In other words, a larger displacement indicates a higher movement speed of the virtual object, and a smaller displacement indicates a lower movement speed of the virtual object.

In the video game scenario, for ease of user operations, a terminal interface may further be provided with two buttons, to control the virtual object to move automatically at a target speed. That the virtual object moves automatically means that the virtual object continuously moves when no operation is detected on the virtual joystick area, that is, the terminal may control the virtual object to continuously move without a touch operation of the user. Specifically, a first button may be provided at a first position in one area of the screen, and a second button may be provided at a second position in another area of the screen. The second position is located near the virtual joystick area, the first button has the same function as the second button, and the first position and the second position are respectively located in different areas on the screen. In a possible implementation, the first position and the second position may be respectively displayed on two sides of the screen. In this way, the user may freely choose to use the left hand to touch the left button or use the right hand to touch the right button, so that the user may freely choose to use the left hand or the right hand to trigger the same function, making the operation flexible and convenient. Certainly, the first position and the second position may alternatively be located on one side of the screen. The positions of the two buttons may be set or adjusted by relevant technical personnel according to design requirements, or certainly may be set or adjusted by the user according to the user's usage habits, which is not limited in the embodiments of the present disclosure.

FIG. 1 is a schematic diagram of a terminal interface according to an embodiment of the present disclosure. As shown in FIG. 1, for example, the shape of the virtual joystick area is circular, the virtual joystick area is located on the left side of the terminal interface, and the user's touch operation on the virtual joystick area is a slide operation. There may be four direction arrow icons in the virtual joystick area: up, down, left, and right, which are respectively used for indicating forward, backward, to left, and to right. The four direction arrow icons are used only for indicating directions of the virtual joystick area more intuitively, thereby guiding the user how to determine a direction corresponding to a user operation. Certainly, the four direction arrow icons may not be displayed in the virtual joystick area, and the user may gradually become familiar with the touch operation on the virtual joystick area according to actual operating situations. Since a position above the virtual joystick area indicates forward, and the user generally controls the virtual object to automatically move forward, the terminal may set the second button directly above the virtual joystick area, that is, the second position may be located directly above the virtual joystick area. In a possible implementation, the second button may be a graphic, and may also include text information, which is not specifically limited in this embodiment of the present disclosure. On the right side of the terminal interface, the terminal may provide the first button, so that the user may use the right hand to perform a touch operation on the first button, to implement the function of controlling the virtual object to move automatically.

Figure 2:
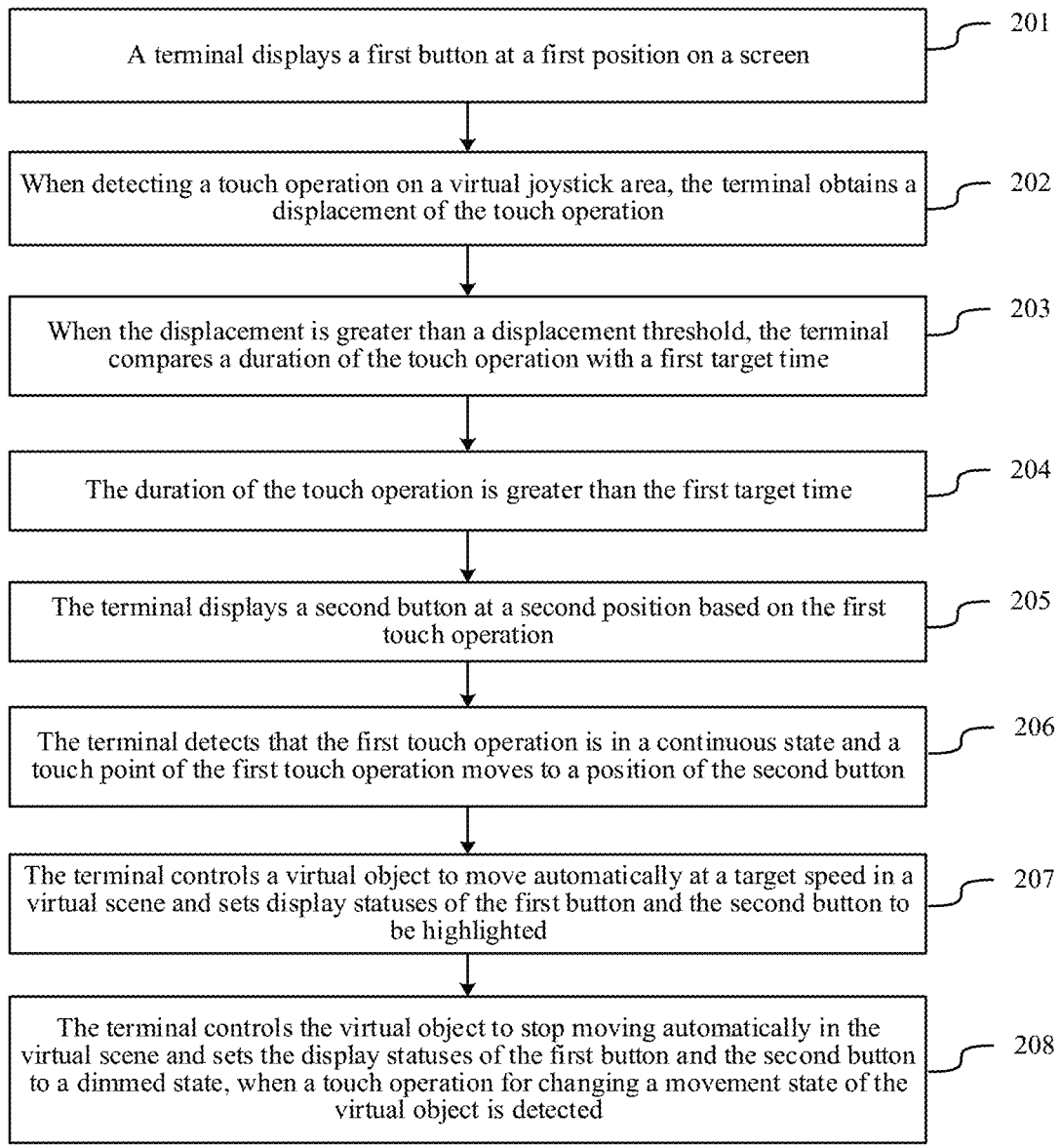
FIG. 2 is a flowchart of a method for controlling a virtual object to move according to an embodiment of the present disclosure.

FIG. 2 is a flowchart of a method for controlling a virtual object to move according to an embodiment of the present disclosure. The method for controlling a virtual object to move is applied to an electronic device. The electronic device is provided as a terminal only for example in the following description. Referring to FIG. 2, the method for controlling a virtual object to move includes the following steps:

201. The terminal displays a first button at a first position on a screen.

A display status of the first button is used for reflecting whether the virtual object moves automatically at a target speed. A default display state of the first button is a dimmed state. The terminal may display the first button in the dimmed state at the first position on a screen. The first button being in the dimmed state may be used for reflecting that the virtual object is not moving automatically at the target speed. Certainly, when detecting a touch operation on the first button, the terminal may set the display status of the first button. The first position may be an area on the left or right side of the screen. In a possible implementation, the first position and a virtual joystick area may be located in two areas on two sides of the terminal screen respectively, so that a user may perform a corresponding operation on either side of the screen to control the virtual object to move. For example, as shown in FIG. 1, the terminal may display the first button in the area on the right side of the screen.

202. When detecting a touch operation on a virtual joystick area, the terminal obtains a displacement of the touch operation.

The touch operation may be a slide operation, or a drag and drop operation. The drag and drop operation refers to an operation of pressing an icon on the screen and moving the icon to another position relatively slowly. In this embodiment of the present disclosure, when the touch operation is a slide operation, the touch operation may start from the virtual joystick area and slide in a direction away from the virtual joystick area. When the touch operation is a drag and drop operation, the touch operation may start from the virtual joystick area and drag a virtual joystick out of the virtual joystick area. Certainly, the touch operation may alternatively be another operation, for example, a click/tap operation or a press operation. That the touch operation is a slide operation or a drag and drop operation is used only as an example for description herein. The specific operation mode of the touch operation is not limited in this embodiment of the present disclosure.

When detecting the touch operation on the virtual joystick area, the terminal may first obtain the displacement of the touch operation, so that the terminal may subsequently determine, based on the displacement, whether a movement speed that the current touch operation controls the virtual object to move reaches a speed threshold. The speed threshold may be the same as the target speed of the automatic movement, or may be less than the target speed, and a difference between the speed threshold and the target speed is less than a target speed difference. The displacement may refer to a distance between an end point position of the touch operation and a center point of the virtual joystick area.

In a possible implementation, to more intuitively indicate a direction of the user's current touch operation relative to the virtual joystick area, when detecting the user's touch operation on the virtual joystick area, the terminal may further display on the screen that the virtual joystick moves with a touch point of the user's touch operation. Specifically, the virtual joystick may be displayed as a circular area. Further, the terminal may display that the circular area follows the touch point of the user's touch operation, and display a drag and drop effect between the circular area and the virtual joystick area. For example, the drag and drop effect may be a fan-shaped area formed by the circular area and the center point of the virtual joystick area. When detecting that the touch operation ends, the terminal may further display that the virtual joystick returns to the center of the virtual joystick area. For example, the terminal displays that the virtual joystick bounces back to the center of the virtual joystick area, or the terminal directly sets a display status of the virtual joystick to a hidden state. Certainly, the terminal may alternatively not display the virtual joystick, which is not specifically limited in this embodiment of the present disclosure.

203. When the displacement is greater than a displacement threshold, the terminal compares a duration of the touch operation with a first target time.

In a possible implementation, when detecting the touch operation on the virtual joystick area, the terminal may control the virtual object to move at a movement speed corresponding to the touch operation.

The terminal may determine whether the movement speed of the virtual object corresponding to the touch operation reaches the speed threshold based on the displacement of the current touch operation, and determine whether the duration of the touch operation reaches the first target time when the movement speed reaches the speed threshold.

When located in different environments, the virtual object has different motion states, and moves automatically at different target speeds. For example, the movement speed of the virtual object during swimming may be different from the movement speed of the virtual object during running, flying, or crawling, and the target speed of the virtual object may vary with different motion states. The target speed may be preset by technical personnel according to different virtual scenes, and a value of the target speed is not specifically limited in this embodiment of the present disclosure.

If the displacement is greater than the displacement threshold, it means that the movement speed of the virtual object has reached the speed threshold, and a preliminary condition for switching to automatic movement has been met, and then the terminal may further obtain a time that the user manually controls the virtual object to move. If the time is short, there is no need to provide a function of controlling the virtual object to move automatically. If the time is long, the terminal may provide the function to improve the convenience of operations. Specifically, the terminal may determine whether the duration of the touch operation reaches the first target time to determine whether to provide the function of controlling the virtual object to move automatically. The first target time may be preset by technical personnel. Alternatively, the first target time may be set based on the foregoing target speed, the size of the virtual scene, or the like. For example, the first target time may be 2 seconds (s), which is not specifically limited in this embodiment of the present disclosure.

204. If the duration of the touch operation is greater than the first target time, the terminal performs step 205.

If the duration of the touch operation is greater than the first target time, that is, the terminal detects a first touch operation on the virtual joystick area, the terminal may perform the following step 205 to provide the function of controlling the virtual object to move automatically. If the duration is less than or equal to the first target time, the terminal does not need to provide the function but may directly control the virtual object to move according to the user's touch operation. The first touch operation refers to a touch operation that meets the foregoing two conditions for providing the function of controlling the virtual object to move automatically.

The foregoing steps 202 to 204 show a process in which when a touch operation on the virtual joystick area is detected, a displacement of the touch operation is greater than the displacement threshold, and a duration of the touch operation is greater than the first target time, conditions for detecting the first touch operation on the virtual joystick area are met, which is essentially a process in which when detecting the user's touch operation, the terminal determines whether the touch operation meets the conditions for providing the function of controlling the virtual object to move automatically. When the conditions are met, the terminal may perform the following step 205.

205. The terminal displays a second button at a second position based on the first touch operation.

The second button has the same function as the first button. Similarly, a display status of the second button may be used for reflecting whether the virtual object moves automatically at the target speed. When the second button is in the hidden state or the dimmed state, it may be used for reflecting that the virtual object is not moving automatically at the target speed. In step 205, the display status of the second button is the dimmed state. A default display state of the second button is the hidden state. When the terminal detects the first touch operation on the virtual joystick area through the foregoing steps 202 to 204, the terminal displays the second button. When the terminal displays the second button, the user can perform a touch operation on the position of the second button to trigger the virtual object to move automatically.

Figure 3:
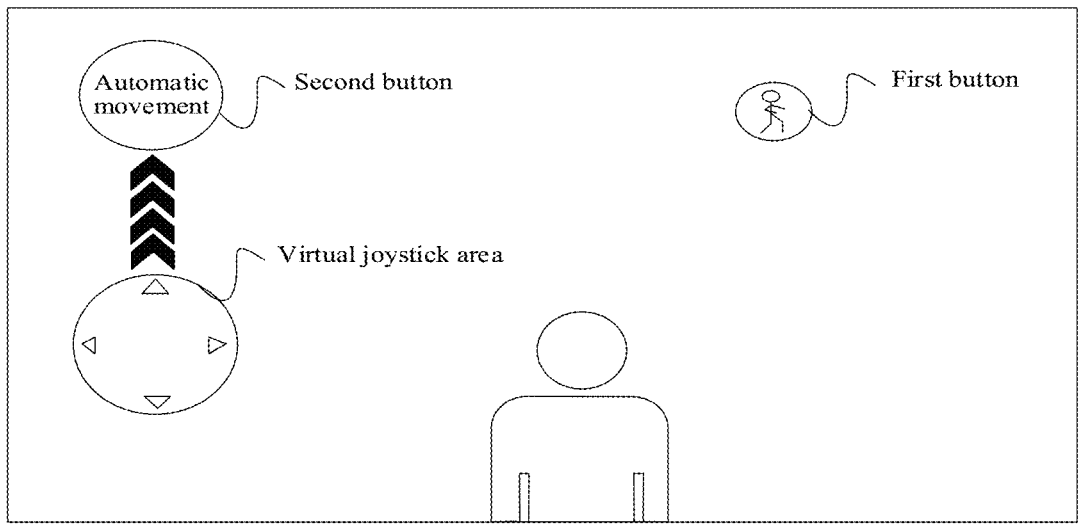
FIG. 3 is a schematic diagram of a terminal interface according to an embodiment of the present disclosure.
Figure 4:
FIG. 4 is a diagram of an actual terminal interface according to an embodiment of the present disclosure.

In a possible implementation, the terminal may further display prompt information when detecting that the duration of the touch operation is greater than the first target time in step 204. The prompt information is used for prompting to continue the first touch operation and move a touch point of the first touch operation to the position of the second button, to perform a second touch operation on the second button. The touch point of the first touch operation may be a touch point between the user's finger or another object used for performing a touch operation and the terminal screen. In this embodiment of the present disclosure, that the user performs a touch operation on the terminal screen with a finger is used as an example for description. In a possible implementation, the prompt information may be text information or picture information, and a specific form of the prompt information is not limited in this embodiment of the present disclosure. In a possible implementation, the prompt information may be an arrow. A target arrow is displayed between the virtual joystick area and the second button, a direction of the target arrow pointing to the second button from the virtual joystick area. Certainly, the target arrow may have a static effect or a dynamic effect to dynamically reflect a movement trajectory of the user's first touch operation, so that the user may correctly perform a touch operation on the second button, to switch a movement state of the virtual object to an automatic movement state. For example, a specific display effect of the target arrow may be shown in FIG. 3. The second button is located above the virtual joystick area, and the target arrow points to the second button from the virtual joystick area. A diagram of an actual interface is shown in FIG. 4. Certainly, the second button may alternatively be located at another position. The second position of the second button may be set by technical personnel according to operating habits of users, which is not specifically limited in this embodiment of the present disclosure.

The foregoing steps 202 to 205 show a process in which when the terminal detects the first touch operation on the virtual joystick area, the terminal displays the second button at the second position based on the first touch operation. The terminal needs to detect that the touch operation meets the two conditions that the displacement is greater than the displacement threshold and the duration is greater than the first target time. In this case, the user may be controlling the virtual object to move quickly, so that the second button may be displayed while the virtual object is controlled to move quickly, to remind the user that a current fast movement state of the virtual object may be set to the automatic movement state. If the displacement of the touch operation is less than or equal to the displacement threshold after step 202, it may be understood that, the user may currently be controlling the virtual object to move slowly, and the user may not need to control the virtual object to move automatically. Therefore, the terminal may not perform steps 203 to 205, but directly control the virtual object to move according to the movement speed corresponding to the touch operation based on a correspondence between the displacement and the movement speed, without displaying the second button.

206. When it is detected that the first touch operation is in a continuous state and a touch point of the first touch operation moves to a position of the second button, perform step 207.

The terminal displays the second button on the screen, and the user may continue the current first touch operation and move the touch point of the first touch operation to the position of the second button based on the prompt information. In this case, after the terminal detects that the first touch operation is in a continuous state and the touch point of the first touch operation moves to the position of the second button, that is, detects that the user performs the second touch operation on the second button, the second touch operation meaning that the function of controlling the virtual object to move automatically is started or activated, the terminal may perform the following step 207, to provide a service for controlling the virtual object to move automatically.

207. The terminal controls the virtual object to move automatically at a target speed in a virtual scene and sets display statuses of the first button and the second button to be highlighted.

In a possible implementation, the purpose of triggering and canceling the same function through two buttons is that: the user may choose to use the dominant hand to touch the first button or the second button. Because the user may use either hand to trigger the function of controlling the virtual object to move automatically, the user may use one hand to perform another touch operation while using the other hand to trigger the automatic movement function, thereby facilitating division of labor between the two hands. This can better adapt to the user's operating habits, thereby improving the convenience and flexibility of operations. The foregoing is a case in which the first position and the second position are located in areas on two sides of the screen. Certainly, the first position and the second position may alternatively be located in different areas on one side of the screen, to cater to the user's different operating habits, thereby improving the convenience and flexibility of operations. In a possible implementation, when detecting that either of the first button and the second button is triggered, the terminal may perform step 207. Only the specific process in which the user performs a touch operation on the second button to control the virtual object to move automatically is described in this embodiment of the present disclosure. In an operation mode in which the user performs a touch operation on the first button, the terminal may perform steps in a method provided in an embodiment shown in FIG. 7 when detecting the touch operation on the first button. Details are not further described herein.

If the terminal detects the second touch operation on the second button, the terminal may control the virtual object to move at the target speed, and the movement state of the virtual object becomes the automatic movement state. In other words, the terminal keeps controlling the virtual object to move according to the current movement direction and the current movement speed without any operation by the user.

In this embodiment of the present disclosure, although the terminal detects that the second touch operation of the user is performed on the second button, both the first button and the second button are function buttons for controlling the virtual object to move automatically, and the first button and the second button are linked on the terminal, so that the terminal may set the display statuses of the first button and the second button to be highlighted no matter the detected touch operation is on which button, to show that the function of controlling the virtual object to move automatically has been activated currently, and indicate that the virtual object is automatically moving at the target speed and there is no need for the user to manually synchronize the display statuses of the two buttons, thereby reducing the complexity of user operations and improving the convenience and flexibility of user operations. The highlighting effect may be that both the first button and the second button are entirely highlighted, edges of the first button and the second button are highlighted, or the first button and the second button present a special effect such as glowing or flickering, which is not specifically limited in this embodiment of the present disclosure.

In a possible implementation, in step 207, after setting the display statuses of the first button and the second button to be highlighted, the terminal may further control the second button to be displayed in the center of the virtual joystick area. Specifically, the terminal may dynamically move a display area of the second button from the second position to the center of the virtual joystick area. Specifically, a movement process of the display area of the second button may be shown as a bouncing effect. When the terminal detects a further touch operation on the first button or the second button after setting the display statuses of the first button and the second button to be highlighted, the terminal may control the virtual object to stop moving automatically. Certainly, when detecting the touch operation on the virtual joystick area, the terminal may alternatively control the virtual object to stop moving automatically.

Generally, the user may be used to stopping the automatic movement state of the virtual object before controlling the virtual object to take a next move. In this case, the user may first perform a touch operation on the first button or the second button, and then perform a touch operation on the virtual joystick area. Therefore, the user needs to perform two steps. When the terminal controls the second button to be displayed in the center of the virtual joystick area, the user may directly perform a drag and drop operation starting from the virtual joystick area. In this way, when detecting the user's touch operation on the second button displayed in the center of the virtual joystick area, the terminal may control the virtual object to stop moving automatically, and control the virtual object to move at a speed corresponding to the drag and drop operation based on the user's drag and drop operation, thereby improving the continuity and convenience of user operations.

Figure 5:
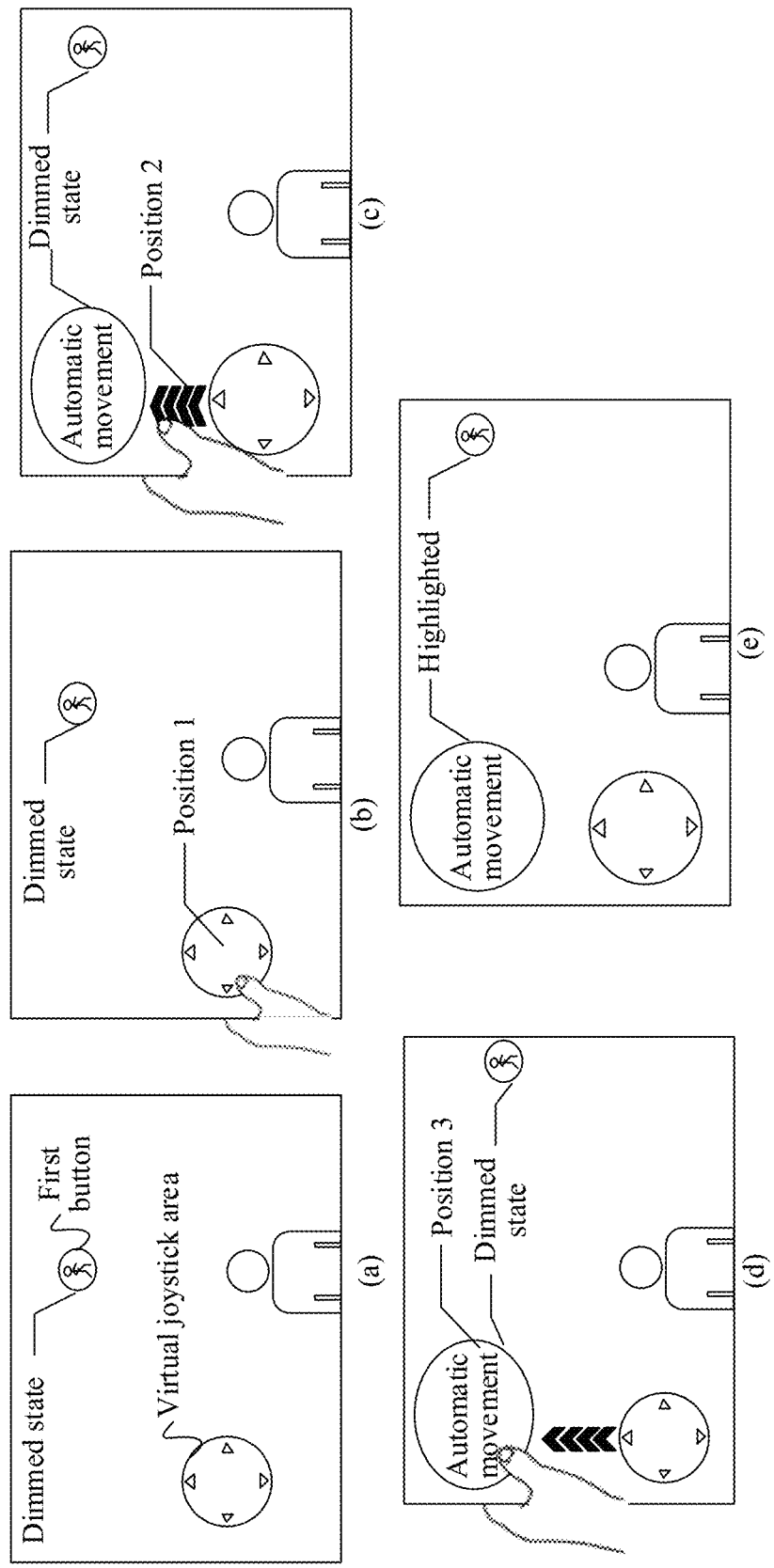
FIG. 5 is a schematic diagram of a method for controlling a virtual object to move according to an embodiment of the present disclosure.
Figure 6:
FIG. 6 is a diagram of an actual terminal interface according to an embodiment of the present disclosure.

The foregoing steps 202 to 207 show a process in which the terminal updates display statuses of the virtual object, the first button, and the second button in the terminal interface when detecting the second touch operation on the second button based on the detected first touch operation of the user. An exemplary description is provided below with reference to FIG. 5 regarding a display situation of the terminal interface in the foregoing steps. FIG. 5 is a schematic diagram of a method for controlling a virtual object to move according to an embodiment of the present disclosure. As shown in FIG. 5, before the terminal detects the user's touch operation on the virtual joystick area, as shown in (a) of FIG. 5, the terminal may display only the first button and the virtual joystick area, and the display status of the first button is not highlighted. As shown in (b) and (c), when the user's finger moves from a position 1 to a position 2, when the terminal detects that the touch point of the user's touch operation moves from the position 1 to the position 2, a displacement between the position 1 and the position 2 is greater than the displacement threshold, and the user's hand keeps pressing on the position 2 for the first target time, the terminal may display the second button and the prompt information on the terminal interface. As shown in (d), the user may continue the touch operation and move to the second button in a direction of the arrow, that is, move from the position 2 to a position 3. Then, after detecting the user's movement operation, the terminal may set the display statuses of the first button and the second button to be highlighted. The terminal interface when the first button and the second button are highlighted is shown in (e), and a diagram of an actual interface is shown in FIG. 6.

208. The terminal controls the virtual object to stop moving automatically in the virtual scene and sets the display statuses of the first button and the second button to a dimmed state, when a touch operation for changing a movement state of the virtual object is detected.

The touch operation for changing the movement state of the virtual object may be a touch operation on the first button or the second button, a touch operation on a button for controlling the virtual object to squat or lie down, or a touch operation on the virtual joystick area. The user changes the movement state of the virtual object through the touch operation, and it may be considered that the user wants to cancel the automatic movement of the virtual object and manually control the virtual object. Therefore, when detecting the touch operation, the terminal may control the virtual object to stop moving automatically in the virtual scene. Specifically, if the touch operation is a touch operation on the first button or the second button, the terminal may control the virtual object to stop moving. If the touch operation is to control the virtual object to squat or lie down, the terminal controls the virtual object to stop the current movement state, and controls the virtual object to squat or lie down at a current position. If the touch operation is a touch operation on the virtual joystick area, the terminal controls the virtual object to stop the current movement state, and controls the virtual object to move according to a direction and a speed corresponding to the touch operation.

In a possible implementation, when the terminal sets the display statuses of the first button and the second button to a dimmed state, since the default display state of the second button when the virtual object is not controlled to move automatically is the hidden state, when detecting the touch operation for changing the movement state of the virtual object, the terminal may further set the display status of the second button to the hidden state.

In the foregoing process of controlling the virtual object to move, there may further be a detection mechanism. Specifically, a timer may be set in the terminal. Based on the timer, it is periodically detected whether a display status corresponding to a detected touch operation is consistent with a display status on the screen. When it is detected that the display status corresponding to the first touch operation or the second touch operation is inconsistent with the display status on the screen, the terminal updates the display status on the screen according to the display status corresponding to the first touch operation or the second touch operation, the display status including the display statuses of the first button and the second button and the movement state of the virtual object.

In this embodiment of the present disclosure, the second button is displayed when it is detected that the touch operation on the virtual joystick area meets a requirement, and when the touch operation on the second button is detected, the virtual object can be controlled to move automatically and the display statuses of the two buttons corresponding to the automatic movement function are set to be highlighted, so that the automatic movement of the virtual object and the linkage between the two buttons can be implemented through simple touch operations, and the user does not need to manually synchronize the display statuses of the two buttons, thereby reducing the complexity of user operations and improving the convenience and flexibility of user operations.

Figure 7:
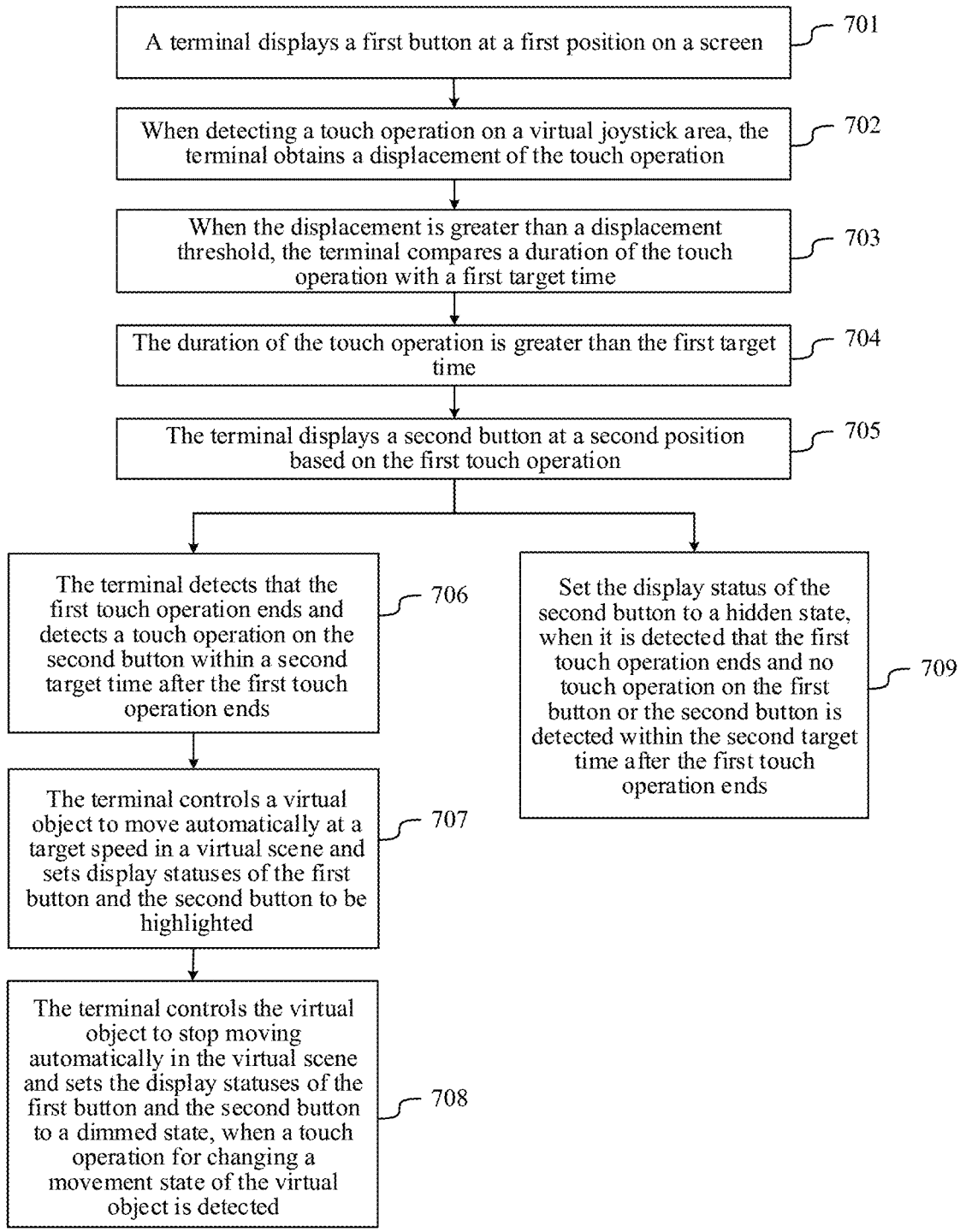
FIG. 7 is a flowchart of a method for controlling a virtual object to move according to an embodiment of the present disclosure.

In the embodiment shown in FIG. 2, when the terminal displays the second button, the user may continue the first touch operation and move the touch point of the first touch operation to the position of the second button to trigger the automatic movement function of the virtual object. In a possible implementation, when the terminal displays the second button, there is another operation mode that can trigger the automatic movement function of the virtual object. This operation mode is described in detail below by using the embodiment shown in FIG. 7. As shown in FIG. 7, when a terminal uses this operation mode, the method for controlling a virtual object to move may include the following steps:

701. The terminal displays a first button at a first position on a screen.

702. When detecting a touch operation on a virtual joystick area, the terminal obtains a displacement of the touch operation.

703. When the displacement is greater than a displacement threshold, the terminal compares a duration of the touch operation with a first target time.

704. If the duration of the touch operation is greater than the first target time, the terminal performs step 705.

705. The terminal displays a second button at a second position based on the first touch operation.

Steps 701 to 705 are similar to the foregoing steps 201 to 205. Details are not described herein again.

706. When it is detected that the first touch operation ends and a touch operation on the second button is detected within a second target time after the first touch operation ends, the terminal performs step 707.

The second target time may be determined by technical personnel according to usage habits of general users. For example, the second target time may be 1 s. A specific value of the second target time is not specifically limited in this embodiment of the present disclosure. Step 706 and step 206 show two operation modes for performing the second touch operation on the second button. Different from step 206, in step 706, the terminal detects that the first touch operation ends before the touch point of the first touch operation is moved to the position of the second button, and the touch operation on the second button is detected within the second target time. For example, as shown in (d) of FIG. 5, for the movement from the position 2 to the position 3, the user's hand does not continuously press the screen and slide on the screen, but leaves the screen from the position 2 or somewhere between the position 2 and the position 3 and click/ taps the position 3 within the second target time, or moves from another position to the position 3 within the second target time. During this process, the user's hand does not continuously press the screen. After detecting that the user's touch operation ends, the terminal may still display the second button on the screen for a period of time. In this case, if it is detected that the user performs a touch operation on the second button during this period of time, this operation is the second touch operation, that is, the terminal detects the second touch operation on the second button.

If the terminal immediately sets the display status of the second button to the hidden state when detecting that the first touch operation ends, the user cannot perform a touch operation on the second button. Therefore, if the user wants to control the virtual object to move automatically, the user needs to perform the first touch operation again, which is cumbersome and takes a long time. Especially for a tactical competitive game in which a player competes against time, this may affect an outcome of an entire round of the game. Compared with the design that the terminal immediately sets the display status of the second button to the hidden state when the first touch operation ends, for users who are used to click/taping buttons on the screen, this operation mode provided in this embodiment of the present disclosure can effectively avoid the foregoing situation, thereby reducing the complexity of user operations and improving the flexibility and convenience of user operations.

That it is detected that the first touch operation ends in step 706 may occur at any time after the terminal finishes performing step 705. If the user continues the first touch operation without performing the second touch operation on the second button, the terminal will always perform step 705, and when the user performs the second touch operation, the terminal may perform step 706.

707. The terminal controls the virtual object to move automatically at a target speed in a virtual scene and sets display statuses of the first button and the second button to be highlighted.

708. The terminal controls the virtual object to stop moving automatically in the virtual scene and sets the display statuses of the first button and the second button to a dimmed state, when a touch operation for changing a movement state of the virtual object is detected.

Steps 707 and 708 are similar to steps 207 and 208. Details are not described herein again.

The foregoing steps 706 to 708 show a case in which a touch operation on the second button is detected within the second target time after the first touch operation ends. In a possible implementation, if a touch operation on the first button is detected within the second target time after the first touch operation ends, the terminal may also perform the foregoing steps 707 and 708. Certainly, there is another possible case: it is detected that the first touch operation ends, and no touch operation on the first button or the second button is detected within the second target time after the first touch operation ends. For a processing method of the terminal in this case, refer to step 709.

709. Set the display status of the second button to a hidden state, when it is detected that the first touch operation ends and no touch operation on the first button or the second button is detected within the second target time after the first touch operation ends.

According to the operating habits of general users, if the user wants to trigger the second button to control the virtual object to move automatically, the user usually performs a touch operation on the first button or the second button within the second target time, so that the terminal may start the automatic movement function of the virtual object after detecting the touch operation. If the user does not perform a touch operation on the first button or the second button within the second target time, the user may want the virtual object to stop moving. Then the terminal may set the display status on the screen to an initial state when the virtual object is not controlled to move, that is, may set the display status of the second button to the hidden state. If the user later wants to perform a touch operation on the second button, relevant operations detected by the terminal in steps 702 to 705 may be performed again, and the terminal displays the second button based on the user's operations. Correspondingly, the terminal may detect that the first touch operation ends when the user's finger leaves the screen without continuing the touch operation or performs another touch operation on the virtual joystick area. When no touch operation is detected, the terminal may control the virtual object to stop moving, or when the another touch operation on the virtual joystick area is detected, the terminal may control the virtual object to move according to a movement direction and a speed corresponding to the touch operation.

In this embodiment of the present disclosure, another operation mode for performing a touch operation on the second button is provided, which considers operating habits of users, reduces the complexity of user operations, and improves the flexibility and convenience of user operations.

The terminal may simultaneously provide the two operation modes for performing a touch operation on the second button in the embodiments shown in FIG. 2 and FIG. 7, to provide flexible and selectable operation modes, thereby adapting to different operating habits of users.

Figure 8:
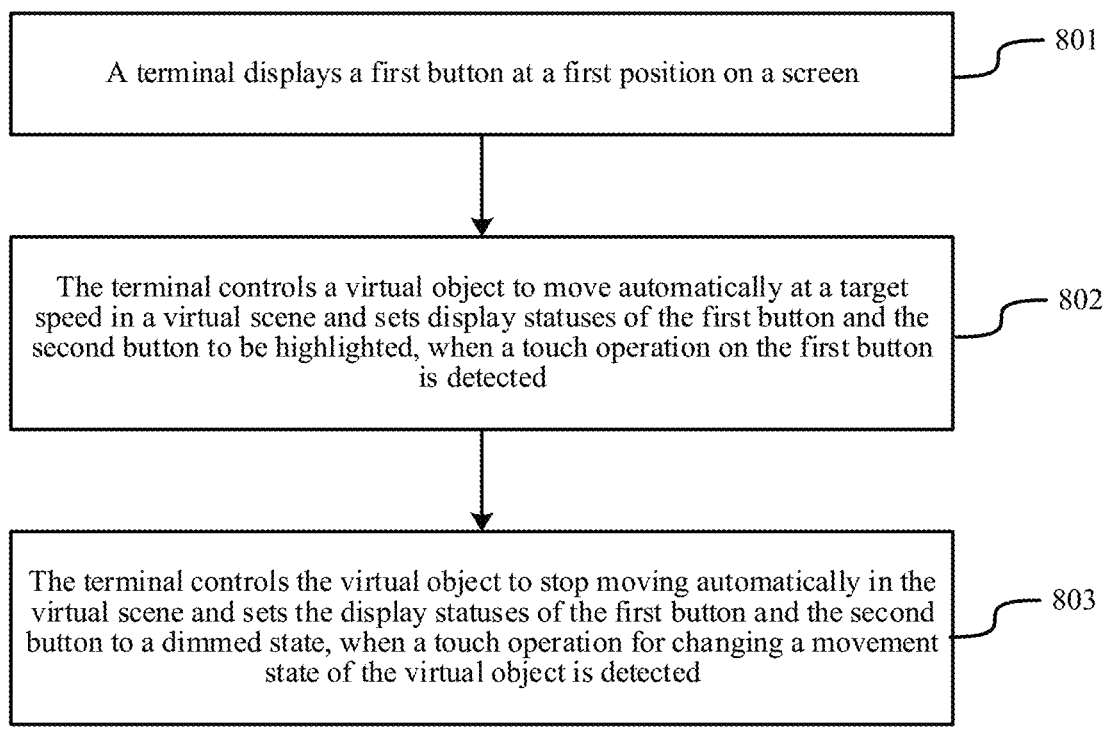
FIG. 8 is a flowchart of a method for controlling a virtual object to move according to an embodiment of the present disclosure.

The embodiments shown in FIG. 2 and FIG. 7 both show a process in which a touch operation is performed on the second button to control the virtual object to move automatically, and the display statuses of the first button and the second button are set to be highlighted. In a possible implementation, since the second button has the same function as the first button, and the first button remains in a displayed state, the user may alternatively directly perform a touch operation on the first button to trigger the automatic movement function. As shown in FIG. 8, when this operation mode is used, the method for controlling a virtual object to move includes the following steps:

801. The terminal displays a first button at a first position on a screen.

802. The terminal controls the virtual object to move automatically at a target speed in a virtual scene and sets display statuses of the first button and a second button to be highlighted, when a touch operation on the first button is detected.

The touch operation on the first button may be a click/tap operation, or another touch operation such as a press operation. An operation mode of the touch operation on the first button is not specifically limited in this embodiment of the present disclosure. Step 802 may be performed when the terminal detects no touch operation on the virtual joystick area, or may be performed when the terminal detects a touch operation on the virtual joystick area. Even in the foregoing step 706, when the terminal detects no touch operation on the second button within the second target time, but detects a touch operation on the first button, the terminal may perform the step of controlling the virtual object to move automatically at a target speed in a virtual scene and setting display statuses of the first button and a second button to be highlighted.

Correspondingly, on the one hand, when the terminal performs step 802, the virtual object may be in a stationary state, or may be in a moving state. When the virtual object is in a stationary state or in a state of moving backward, the terminal may control the virtual object to move automatically to the front of the virtual object at the target speed in the virtual scene. When the virtual object is in a state of moving forward, the terminal may control the virtual object to move automatically in the same movement direction at the target speed in the virtual scene. On the other hand, when the terminal performs step 802, the second button may be in a displayed state or a hidden state. When the second button is in the hidden state, the terminal may display the second button on the screen and set the display statuses of the first button and the second button to be highlighted when performing step 802.

The first button is always in the displayed state, and when the user directly performs a touch operation on the first button, the terminal may perform step 802 immediately when detecting the touch operation. Compared with the operation mode in which a touch operation is performed on the virtual joystick area for the first target time to cause the terminal to display the second button, the operation is simpler and faster. Moreover, the first button and the second button are located in different areas of the screen, so that the user may choose to perform a touch operation on either button according to usage habits. If the first button and the second button are located on two sides of the screen, the user may use the left hand or the right hand to perform a touch operation on the first button or the second button. In this way, when the user controls the virtual object to move automatically while performing another touch operation, division of labor between the left hand and the right hand may be facilitated, to operate conveniently and flexibly through switching between the left hand and the right hand.

Figure 9:
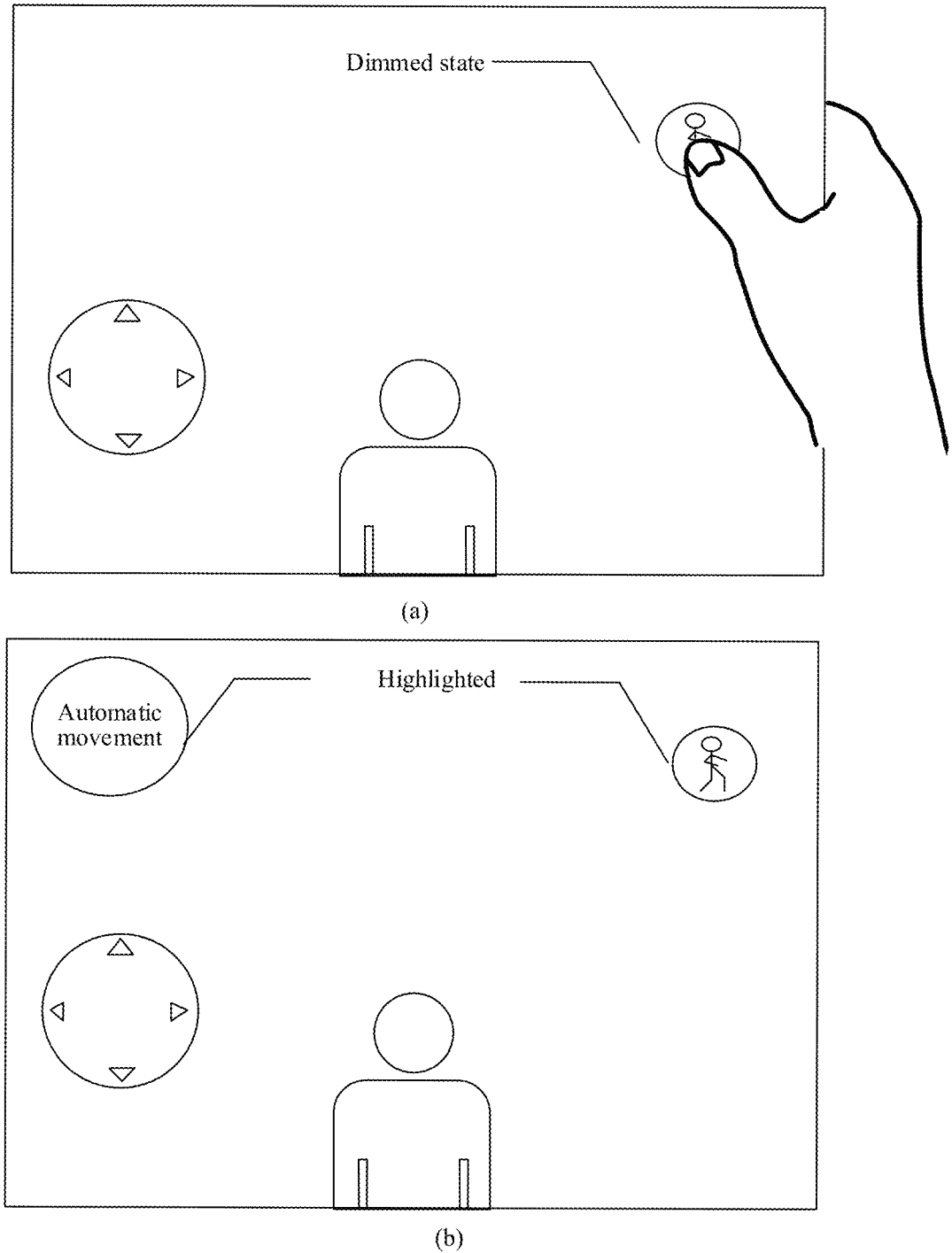
FIG. 9 is a schematic diagram of a terminal interface according to an embodiment of the present disclosure.

For example, as shown in (a) of FIG. 9, the second button in the terminal interface may be originally in the hidden state. When the user performs a touch operation on the first button in the terminal interface, the terminal highlights the first button and the second button when detecting the touch operation, as shown in (b) of FIG. 9.

803. The terminal controls the virtual object to stop moving automatically in the virtual scene and sets the display statuses of the first button and the second button to a dimmed state, when a touch operation for changing a movement state of the virtual object is detected.

Step 803 is similar to the foregoing step 208 or step 708. Details are not described herein.

In this embodiment of the present disclosure, a trigger operation is performed on the first button to trigger the function of controlling the virtual object to move automatically, so that a flexible and quick operation mode is provided, and when the user controls the virtual object to move automatically while performing another touch operation, division of labor between the left hand and the right hand may be facilitated, to operate conveniently and flexibly through switching between the left hand and the right hand.

Figure 10:
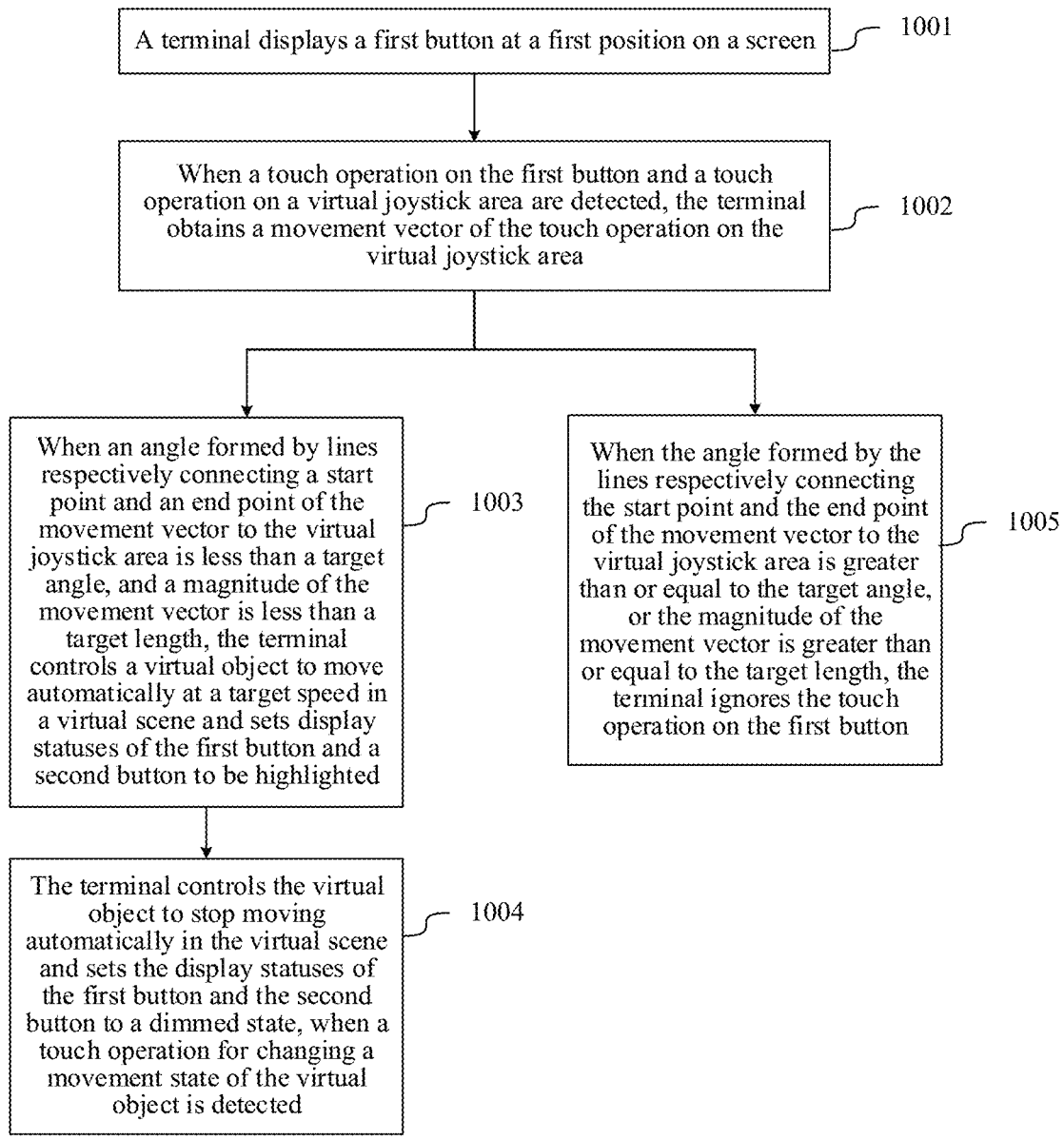
FIG. 10 is a flowchart of a fault-tolerant processing method according to an embodiment of the present disclosure.

In a possible implementation, since the terminal can provide two entrances to the automatic movement function: the first button and the second button, and functions of the first button and the second button are linked, the terminal may further perform fault-tolerant processing on the first button and the second button: when a touch operation on the first button and a touch operation on the virtual joystick area are detected and an operating range of the touch operation on the virtual joystick area is greater than a target operating range, the terminal ignores the touch operation on the first button. As shown in FIG. 10, a specific fault-tolerant processing process performed by a terminal may include the following steps:

1001. The terminal displays a first button at a first position on a screen.

1002. When a touch operation on the first button and a touch operation on a virtual joystick area are detected, the terminal obtains a movement vector of the touch operation on the virtual joystick area.

In a possible implementation, when a user uses the right hand to perform a touch operation on the first button, the left hand may have not finished a touch operation on the virtual joystick area. In this case, when detecting the touch operation on the first button, the terminal also detects the touch operation on the virtual joystick area, and the terminal needs to determine, according to an operating range of the left hand, whether the user wants to continue manually controlling a movement state of a virtual object. The terminal may first obtain a movement vector of the touch operation on the virtual joystick area, the movement vector including a direction and a magnitude. Specifically, a process that the terminal obtains the movement vector may be as follows: The terminal uses a position of the touch operation performed on the virtual joystick area when the touch operation on the first button is detected as a start point of the movement vector, and uses a position of the touch operation performed on the virtual joystick area when the touch operation on the virtual joystick area ends as an end point of the movement vector. A vector pointing from the start point to the end point is the movement vector of the touch operation on the virtual joystick area.

1003. When an angle formed by lines respectively connecting the start point and the end point of the movement vector to the virtual joystick area is less than a target angle, and a magnitude of the movement vector is less than a target length, the terminal controls a virtual object to move automatically at a target speed in a virtual scene and sets display statuses of the first button and a second button to be highlighted.

Figure 11:
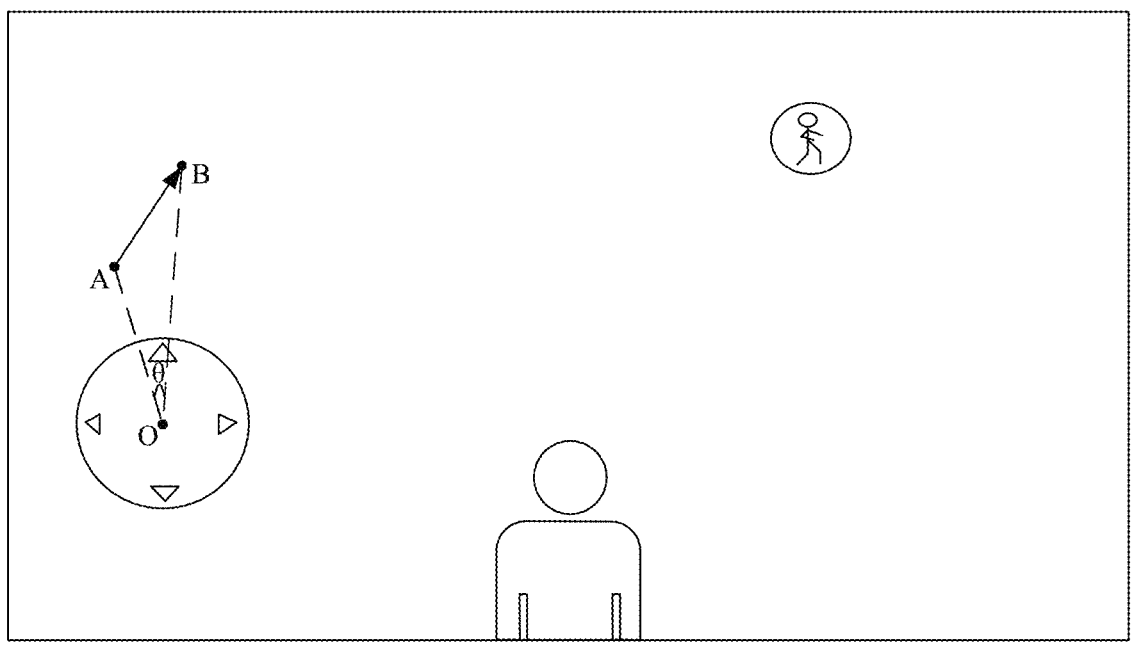
FIG. 11 is a schematic diagram of a determining process during fault-tolerant processing according to an embodiment of the present disclosure.

The operating range of the touch operation on the virtual joystick area may include two dimensions: an angle and a displacement magnitude. The displacement magnitude is the magnitude of the movement vector. Specifically, the angle may be an angle formed by lines respectively connecting the start point and the end point of the movement vector to a center point of the virtual joystick area. As shown in FIG. 11, it is assumed that the center point of the virtual joystick area is O, when the user click/taps the first button, the user's finger is at a position A, then the user's finger moves from the position A to a position B, and the finger leaves the screen at the position B. Then the movement vector is a vector pointing from A to B, the angle refers to an angle θ formed between OA and OB, and the magnitude of the movement vector is a length of a line AB.

Both the angle formed by the lines respectively connecting the start point and the end point of the movement vector to the virtual joystick area and the magnitude of the movement vector can reflect the operating range of the user. Only when both are less than preset values, can the touch operation on the virtual joystick area be considered as a misoperation caused by the user's finger that did not leave the screen in time. Therefore, the terminal may perform step 1003 when detecting that the angle is less than the target angle and the magnitude of the movement vector is less than the target length. Otherwise, the terminal may perform step 1004.

1004. The terminal controls the virtual object to stop moving automatically in the virtual scene and sets the display statuses of the first button and the second button to a dimmed state, when a touch operation for changing a movement state of the virtual object is detected.

Step 1004 is similar to the foregoing step 208, step 708, or step 803. Details are not described herein.

1005. When the angle formed by the lines respectively connecting the start point and the end point of the movement vector to the virtual joystick area is greater than or equal to the target angle, or the magnitude of the movement vector is greater than or equal to the target length, the terminal ignores the touch operation on the first button.

Neither the angle formed by the lines respectively connecting the start point and the end point of the movement vector to the virtual joystick area nor the magnitude of the movement vector can be excessively large. Either being greater than the preset value may be considered as that the user wants to continue manually controlling the virtual object to move rather than control the virtual object to move automatically. The terminal may ignore the touch operation on the second button when either the angle or the magnitude of the movement vector is greater than the preset value.

In this embodiment of the present disclosure, when a touch operation on the first button and a touch operation on the virtual joystick area are detected, whether to respond to the touch operation on the first button is determined according to an operating range of the touch operation on the virtual joystick area, which provides fault-tolerant processing for the two linked buttons having the same function, thereby improving the practicality of linking the first button and the second button.

Figure 12:
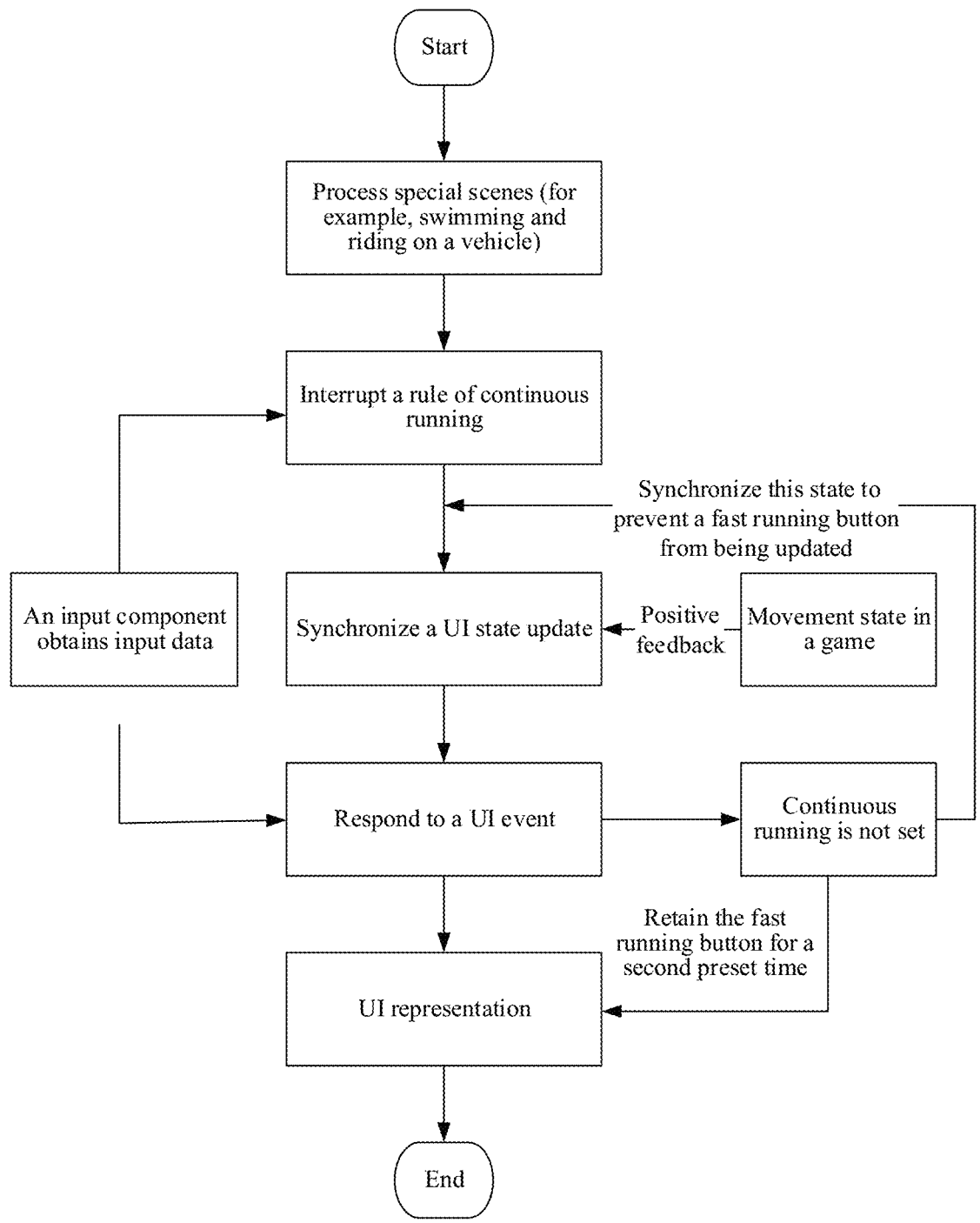
FIG. 12 is a flowchart of a method for controlling a virtual object to move according to an embodiment of the present disclosure.

FIG. 12 is a flowchart of a method for controlling a virtual object to move according to an embodiment of the present disclosure. Referring to FIG. 12, for example, a virtual object is controlled to move in a running mode. A terminal may perform real-time detection on each frame of a terminal interface by using a timer. The terminal first processes special scenes, for example, identifies movement modes such as swimming and riding on a vehicle in a video game, and then obtains input data by using an input component, that is, when a user performs a touch operation, the terminal detects the touch operation, and content of the touch operation is the input data, to interrupt a rule for the virtual object to run automatically, and update the movement state of the virtual object in a user interface (UI), to synchronize a display status of the UI with the input data. The terminal responds to the state update event. What is reflected in the UI is referred to as a UI representation, that is, a current display state in the UI. If the movement state of the virtual object in the UI changes, it will also be detected by the timer, and the timer performs consistency detection on the changed movement state and input data, to update the UI so that the user's input data is consistent with the display status of the UI. When the user does not set automatic running but the touch operation ends, the UI will retain a second button (that is, a fast running button) for a second target time, and synchronize the information to the timer, to prevent the timer from updating the UI state because of determining that the display status is inconsistent when finding that the user does not set automatic running but the UI still displays the second button.

All the foregoing optional technical solutions may form optional embodiments of the present disclosure in any combination, which are not enumerated herein.

Figure 13:
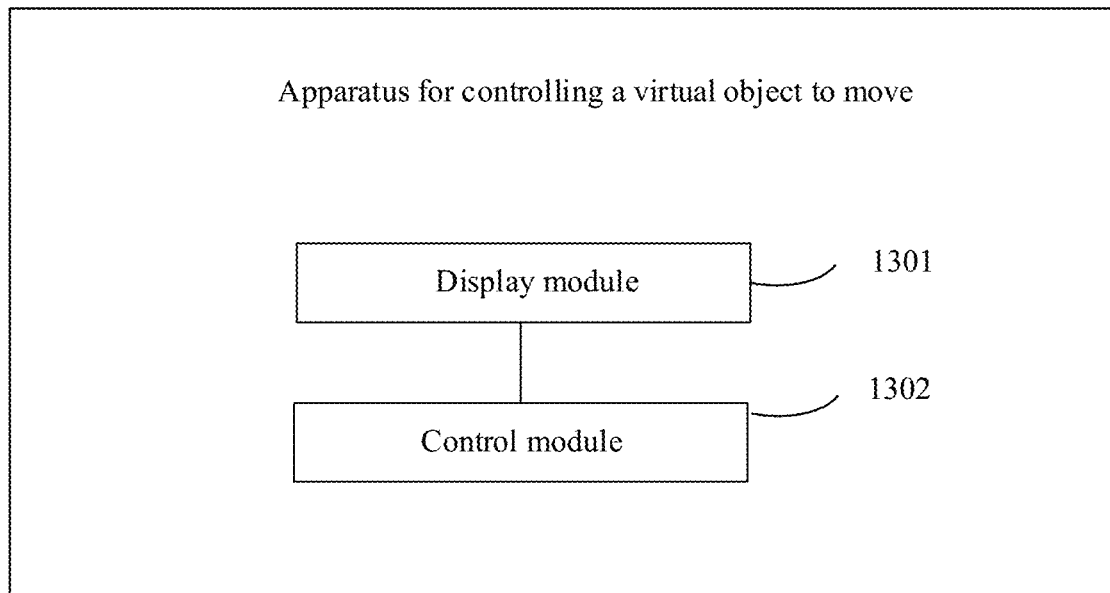
FIG. 13 is a schematic structural diagram of an apparatus for controlling a virtual object to move according to an embodiment of the present disclosure.

FIG. 13 is a schematic structural diagram of an apparatus for controlling a virtual object to move according to an embodiment of the present disclosure. Referring to FIG. 13, the apparatus includes:

a display module 1301, configured to: display a first button at a first position on a screen, a display status of the first button being used for reflecting whether the virtual object moves automatically at a target speed;

the display module 1301 being further configured to: display, in a case that the first touch operation on a virtual joystick area is detected, a second button at a second position based on the first touch operation, the first position and the second position being respectively located in different areas on the screen; and a control module 1302, configured to: control the virtual object to move automatically at the target speed in a virtual scene and set display statuses of the first button and the second button to be highlighted, in a case that a second touch operation on the second button is detected.

In a possible implementation, the display module 1301 is configured to: determine that the first touch operation on the virtual joystick area is detected, in a case that a touch operation on the virtual joystick area is detected, a displacement of the touch operation is greater than a displacement threshold, and a duration of the touch operation is greater than a first target time.

In a possible implementation, the control module 1302 is configured to: determine that the second touch operation on the second button is detected, in a case that it is detected that the first touch operation is in a continuous state and a touch point of the first touch operation moves to a position of the second button.

In a possible implementation, the control module 1302 is configured to: determine that the second touch operation on the second button is detected, in a case that it is detected that the first touch operation ends and a touch operation on the second button is detected within a second target time after the first touch operation ends.

In a possible implementation, the display module 1301 is further configured to: set the display status of the second button to a hidden state, in a case that it is detected that the first touch operation ends and no touch operation on the first button or the second button is detected within the second target time after the first touch operation ends.

In a possible implementation, the display module 1301 is further configured to: display prompt information in a case that the first touch operation on the virtual joystick area is detected, the prompt information being used for prompting to continue the first touch operation and move the touch point of the first touch operation to the position of the second button, to perform the second touch operation on the second button.

In a possible implementation, the display module 1301 is further configured to: display a target arrow between the virtual joystick area and the second button, a direction of the target arrow pointing to the second button from the virtual joystick area.

In a possible implementation, the control module 1302 is further configured to: control the virtual object to stop moving automatically in the virtual scene and set the display statuses of the first button and the second button to a dimmed state, in a case that a touch operation for changing a movement state of the virtual object is detected.

In a possible implementation, the display module 1301 is further configured to: update the display status of the second button to a hidden state, in a case that a touch operation for changing the movement state of the virtual object is detected.

In a possible implementation, the apparatus further includes:

an update module, configured to: update a display status on the screen according to a display status corresponding to the first touch operation or the second touch operation, in a case that it is detected that the display status corresponding to the first touch operation or the second touch operation is inconsistent with the display status on the screen, the display status including the display statuses of the first button and the second button and the movement state of the virtual object.

In a possible implementation, the control module 1302 is further configured to: control the virtual object to move automatically at the target speed in the virtual scene and set the display statuses of the first button and the second button to be highlighted, in a case that a touch operation on the first button is detected.

In a possible implementation, the apparatus further includes:

an ignore module, configured to: ignore the touch operation on the first button, in a case that the touch operation on the first button and a touch operation on the virtual joystick area are detected and an operating range of the touch operation on the virtual joystick area is greater than a target operating range.

By using the apparatus provided in this embodiment of the present disclosure, the second button is displayed when it is detected that the touch operation on the virtual joystick area meets a requirement, and when the touch operation on the second button is detected, the virtual object can be controlled to move automatically and the display statuses of the two buttons corresponding to the automatic movement function are set to be highlighted, so that the automatic movement of the virtual object and the linkage between the two buttons can be implemented through simple touch operations, and a user does not need to manually synchronize the display statuses of the two buttons, thereby reducing the complexity of user operations and improving the convenience and flexibility of user operations.

When the apparatus for controlling a virtual object to move provided in the foregoing embodiment controls a virtual object to move, description is made only through examples of division of the functional modules. In actual application, the functions may be assigned according to needs to be implemented by different functional modules, that is, the internal structure of the apparatus is divided into different functional modules, to implement all or some of the functions described above. In addition, the apparatus for controlling a virtual object to move provided in the foregoing embodiment and the embodiment of the method for controlling a virtual object to move fall within the same conception. For details of a specific implementation process, refer to the method embodiment. Details are not described herein again.

Figure 14:
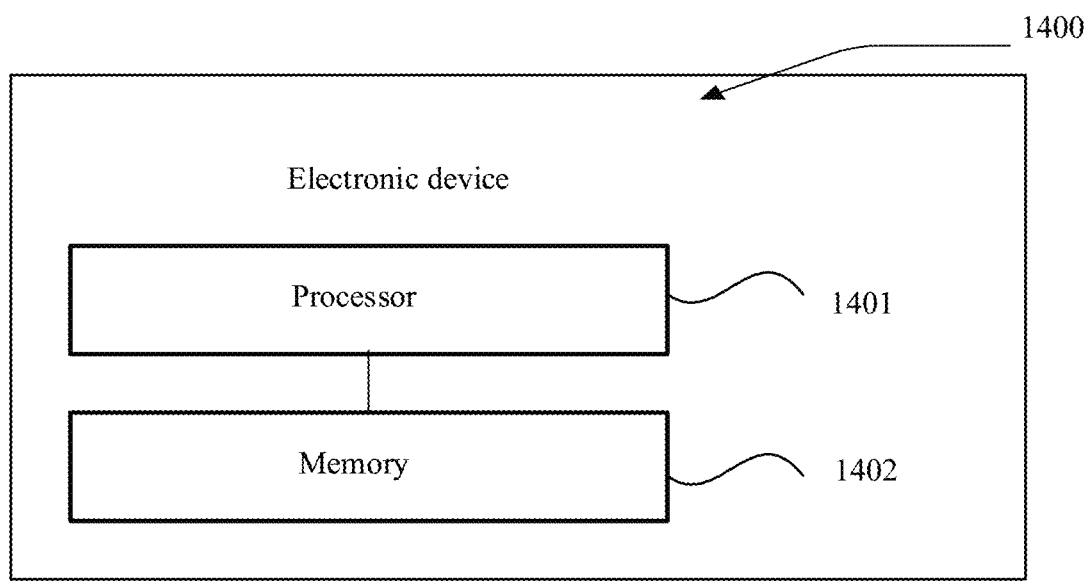
FIG. 14 is a schematic structural diagram of an electronic device 1400 according to an embodiment of the present disclosure.

FIG. 14 is a schematic structural diagram of an electronic device 1400 according to an embodiment of the present disclosure. The electronic device 1400 may vary greatly with different configurations or performance, and may include one or more processors (central processing units (CPUs)) 1401 and one or more memories 1402. The memory 1402 stores at least one instruction, and the at least one instruction is loaded and executed by the processor 1401 to implement the following method operations:

displaying a first button at a first position on a screen, a display status of the first button being used for reflecting whether the virtual object moves automatically at a target speed;

displaying, in a case that the first touch operation on a virtual joystick area is detected, a second button at a second position based on the first touch operation, the first position and the second position being respectively located in different areas on the screen; and controlling the virtual object to move automatically at the target speed in a virtual scene and setting display statuses of the first button and the second button to be highlighted, in a case that a second touch operation on the second button is detected.

In a possible implementation, the processor is configured to: determine that the first touch operation on the virtual joystick area is detected, in a case that a touch operation on the virtual joystick area is detected, a displacement of the touch operation is greater than a displacement threshold, and a duration of the touch operation is greater than a first target time.

In a possible implementation, the processor is configured to: determine that the second touch operation on the second button is detected, in a case that it is detected that the first touch operation is in a continuous state and a touch point of the first touch operation moves to a position of the second button.

In a possible implementation, the processor is configured to: determine that the second touch operation on the second button is detected, in a case that it is detected that the first touch operation ends and a touch operation on the second button is detected within a second target time after the first touch operation ends.

In a possible implementation, the processor is further configured to: set the display status of the second button to a hidden state, in a case that it is detected that the first touch operation ends and no touch operation on the first button or the second button is detected within the second target time after the first touch operation ends.

In a possible implementation, the processor is further configured to: display prompt information in a case that the first touch operation on the virtual joystick area is detected, the prompt information being used for prompting to continue the first touch operation and move the touch point of the first touch operation to the position of the second button, to perform the second touch operation on the second button.

In a possible implementation, the processor is configured to: display a target arrow between the virtual joystick area and the second button, a direction of the target arrow pointing to the second button from the virtual joystick area.

In a possible implementation, the processor is further configured to: control the virtual object to stop moving automatically in the virtual scene and set the display statuses of the first button and the second button to a dimmed state, in a case that a touch operation for changing a movement state of the virtual object is detected.

In a possible implementation, the processor is further configured to: set the display status of the second button to a hidden state, in a case that the touch operation for changing the movement state of the virtual object is detected.

In a possible implementation, the processor is further configured to: update a display status on the screen according to a display status corresponding to the first touch operation or the second touch operation, in a case that it is detected that the display status corresponding to the first touch operation or the second touch operation is inconsistent with the display status on the screen, the display status including the display statuses of the first button and the second button and the movement state of the virtual object.

In a possible implementation, the processor is further configured to: control the virtual object to move automatically at the target speed in the virtual scene and set the display statuses of the first button and the second button to be highlighted, in a case that a touch operation on the first button is detected.

In a possible implementation, the processor is further configured to: ignore the touch operation on the first button, in a case that the touch operation on the first button and a touch operation on the virtual joystick area are detected and an operating range of the touch operation on the virtual joystick area is greater than a target operating range.

Certainly, the electronic device 1400 may further include components such as a wired or wireless network interface, a keyboard, and an input/output interface, to facilitate input and output. The electronic device 1400 may further include another component configured to implement a function of the device, and details are not further described herein.

In an exemplary embodiment, a computer-readable storage medium, for example, a memory including instructions, is further provided. The instructions may be executed by a processor in a terminal, to complete the methods for controlling a virtual object to move in the foregoing embodiments. For example, the computer-readable storage medium may be a read-only memory (ROM), a random access memory (RAM), a compact disc read-only memory (CD-ROM), a magnetic tape, a floppy disk, or an optical data storage device.

A person of ordinary skill in the art may understand that all or some of steps of the embodiments may be implemented by hardware or a program instructing related hardware. The program may be stored in a computer-readable storage medium. The storage medium may be a ROM, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for controlling the movement of a virtual object performed at an electronic device having one or more processors and memory storing programs to be executed by the one or more processors, the method comprising:

displaying a first button at a first position on a screen, a display status of the first button being used for reflecting whether the virtual object moves automatically at a target speed;

displaying, in a case that a first touch operation on a virtual joystick area is detected, a second button at a second position based on the first touch operation, the first position and the second position being respectively located in different areas on the screen; and controlling the virtual object to move automatically at the target speed in a virtual scene and setting display statuses of the first button and the second button to be highlighted, in a case that a second touch operation on the second button is detected.

2. The method according to claim 1, wherein that a first touch operation on a virtual joystick area is detected by:
determining that the first touch operation on the virtual joystick area is detected, in a case that a touch operation on the virtual joystick area is detected, a displacement of the touch operation is greater than a displacement threshold, and a duration of the touch operation is greater than a first target time.

3. The method according to claim 1, wherein that a second touch operation on the second button is detected by:
determining that the second touch operation on the second button is detected, in a case that it is detected that the first touch operation is in a continuous state and a touch point of the first touch operation moves to a position of the second button.

4. The method according to claim 1, wherein that a second touch operation on the second button is detected by:
determining that the second touch operation on the second button is detected, in a case that it is detected that the first touch operation ends and a touch operation on the second button is detected within a second target time after the first touch operation ends.

5. The method according to claim 4, further comprising:
setting the display status of the second button to a hidden state, in a case that it is detected that the first touch operation ends and no touch operation on the first button or the second button is detected within the second target time after the first touch operation ends.

6. The method according to claim 1, further comprising:
displaying prompt information in a case that the first touch operation on the virtual joystick area is detected, the prompt information being used for prompting to continue the first touch operation and move the touch point of the first touch operation to the position of the second button, to perform the second touch operation on the second button.

7. The method according to claim 6, wherein the displaying prompt information further comprises:
displaying a target arrow between the virtual joystick area and the second button, a direction of the target arrow pointing to the second button from the virtual joystick area.

8. The method according to claim 1, further comprising:
after controlling the virtual object to move at the target speed in a virtual scene, controlling the virtual object to stop moving automatically in the virtual scene and setting the display statuses of the first button and the second button to a dimmed state, in a case that a touch operation for changing a movement state of the virtual object is detected.

9. The method according to claim 8, further comprising:
setting the display status of the second button to a hidden state, in a case that the touch operation for changing the movement state of the virtual object is detected.

10. The method according to claim 1, further comprising:
updating a display status on the screen according to a display status corresponding to the first touch operation or the second touch operation, in a case that it is detected that the display status corresponding to the first touch operation or the second touch operation is inconsistent with the display status on the screen, the display status comprising the display statuses of the first button and the second button and the movement state of the virtual object.

11. The method according to claim 1, further comprising:
controlling the virtual object to move automatically at the target speed in the virtual scene and setting the display statuses of the first button and the second button to be highlighted, in a case that a touch operation on the first button is detected.

12. The method according to claim 1, further comprising:
ignoring the touch operation on the first button, in a case that the touch operation on the first button and a touch operation on the virtual joystick area are detected and an operating range of the touch operation on the virtual joystick area is greater than a target operating range.

13. An electronic device, comprising:
a processor; and
a memory configured to store a computer program;
the processor being configured to execute the computer program stored in the memory to implement operations including:
displaying a first button at a first position on a screen, a display status of the first button being used for reflecting whether the virtual object moves automatically at a target speed;
displaying, in a case that a first touch operation on a virtual joystick area is detected, a second button at a second position based on the first touch operation, the first position and the second position being respectively located in different areas on the screen; and
controlling the virtual object to move automatically at the target speed in a virtual scene and setting display statuses of the first button and the second button to be highlighted, in a case that a second touch operation on the second button is detected.

14. The electronic device according to claim 13, wherein the processor is configured to:
determine that the first touch operation on the virtual joystick area is detected, in a case that a touch operation on the virtual joystick area is detected, a displacement of the touch operation is greater than a displacement threshold, and a duration of the touch operation is greater than a first target time.

15. The electronic device according to claim 13, wherein the processor is configured to:
determine that the second touch operation on the second button is detected, in a case that it is detected that the first touch operation is in a continuous state and a touch point of the first touch operation moves to a position of the second button.

16. The electronic device according to claim 13, wherein the processor is configured to:
determine that the second touch operation on the second button is detected, in a case that it is detected that the first touch operation ends and a touch operation on the second button is detected within a second target time after the first touch operation ends.

17. The electronic device according to claim 16, wherein the processor is further configured to:
    set the display status of the second button to a hidden state, in a case that it is detected that the first touch operation ends and no touch operation on the first button or the second button is detected within the second target time after the first touch operation ends.

18. The electronic device according to claim 13, wherein the processor is further configured to:
    display prompt information in a case that the first touch operation on the virtual joystick area is detected, the prompt information being used for prompting to continue the first touch operation and move the touch point of the first touch operation to the position of the second button, to perform the second touch operation on the second button.

19. The electronic device according to claim 13, wherein the processor is further configured to:
    control the virtual object to stop moving automatically in the virtual scene and set the display statuses of the first button and the second button to a dimmed state, in a case that a touch operation for changing a movement state of the virtual object is detected.

20. A non-transitory computer-readable storage medium, storing at least one instruction, at least one program, and a code set or an instruction set, the instruction, the program, and the code set or the instruction set being loaded and executed by a processor to implement operations including:
    displaying a first button at a first position on a screen, a display status of the first button being used for reflecting whether the virtual object moves automatically at a target speed;
    displaying, in a case that a first touch operation on a virtual joystick area is detected, a second button at a second position based on the first touch operation, the first position and the second position being respectively located in different areas on the screen; and
    controlling the virtual object to move automatically at the target speed in a virtual scene and setting display statuses of the first button and the second button to be highlighted, in a case that a second touch operation on the second button is detected.

* * * * *